US007360026B1

(12) United States Patent
Johnson

(10) Patent No.: US 7,360,026 B1
(45) Date of Patent: Apr. 15, 2008

(54) METHOD AND APPARATUS FOR SYNCHRONIZING DATA WITH A REDUCED CLOCK CYCLE RESPONSE TIME

(75) Inventor: Neil Johnson, Ottawa (CA)

(73) Assignee: Altera Corporation, San Jose, CA (US)

( * ) Notice: Subject to any disclaimer, the term of this patent is extended or adjusted under 35 U.S.C. 154(b) by 487 days.

(21) Appl. No.: 10/679,594

(22) Filed: Oct. 6, 2003

(51) Int. Cl.
*G06F 12/00* (2006.01)

(52) U.S. Cl. .................... 711/137; 710/310; 711/154
(58) Field of Classification Search ............. 711/137
See application file for complete search history.

(56) References Cited

U.S. PATENT DOCUMENTS

| | | | | |
|---|---|---|---|---|
| 5,210,749 A | * | 5/1993 | Firoozmand | 370/463 |
| 5,412,646 A | * | 5/1995 | Cyr et al. | 370/411 |
| 5,557,750 A | * | 9/1996 | Moore et al. | 710/310 |
| 5,867,727 A | * | 2/1999 | Hattori | 710/4 |
| 5,977,791 A | * | 11/1999 | Veenstra | 326/40 |
| 6,304,936 B1 | * | 10/2001 | Sherlock | 710/305 |
| 6,615,296 B2 | * | 9/2003 | Daniel et al. | 710/57 |
| 6,891,397 B1 | * | 5/2005 | Brebner | 326/41 |
| 6,907,479 B2 | * | 6/2005 | Karnstedt et al. | 710/52 |
| 2002/0152263 A1 | * | 10/2002 | Goldrian et al. | 709/202 |
| 2003/0115403 A1 | * | 6/2003 | Bouchard et al. | 711/5 |

* cited by examiner

*Primary Examiner*—Donald Sparks
*Assistant Examiner*—Hashem Farrokh
(74) *Attorney, Agent, or Firm*—L. Cho

(57) ABSTRACT

A data buffering unit includes a memory that stores data from a data transmitting device. The data buffering unit also includes a memory read manager that prepares data stored in the memory for output prior to receiving a request for the data from a data reading device.

14 Claims, 7 Drawing Sheets

METHOD AND APPARATUS FOR SYNCHRONIZING DATA WITH A REDUCED CLOCK CYCLE RESPONSE TIME

FIELD

The present invention relates to the buffering of data between devices. More specifically, the present invention related to a method and apparatus for synchronizing data with a reduced clock cycle response time.

BACKGROUND

In the past, single first-in-first-out (FIFO) memories were used to buffer data between devices. Data written into a FIFO memory by a first device could be read by a second device at an appropriate time for the second device. Although the implementation of FIFO memories were adequate in some applications, FIFO memories could not be implemented in applications with tighter timing requirements. For example, in some instances the combinational path and the routing delay associated with a path for a read enable signal to the FIFO memory and/or the combinational path on the data output from the FIFO memory were too long. This resulted in requiring the frequency of the system clock to be reduced, which was undesirable.

In order to improve the timing of a system, approaches were taken to break up the combinational paths in a system by inserting flip-flops between combinational logic along the path. The time required to transmit data between the flip-flops along the combinational path may be used to determine the maximum frequency allowed for a system clock. Although adding flip-flops allowed for the frequency of the system clock to be increased, the addition of the flip-flops also changed the synchronization of the intermediate signals between the flip-flops. For each flip-flop added to a combinational path, an additional clock cycle was required to transmit data along the combinational path. This requirement posed a problem for systems requiring data to be supplied within a limited number of clock cycles after it is requested.

Thus, what is needed is a method and apparatus for synchronizing data with a reduced clock cycle response time.

SUMMARY

A plurality of memories are used to buffer data between devices. Data is written into each of the plurality of memories by a first device in a round robin fashion. Data from the memories are registered to be output by the memories before being requested by a second device. A read enable line to each of the plurality of memories is tied asserted and a read address line to each of the plurality of memories is automatically updated to request data from one memory location ahead of a currently requested memory location. According to an embodiment of the present invention, when the second device requests the data, the data is transmitted to the second device within a single clock cycle.

BRIEF DESCRIPTION OF THE DRAWINGS

The features and advantages of the present invention are illustrated by way of example and are by no means intended to limit the scope of the present invention to the particular embodiments shown, and in which.

DETAILED DESCRIPTION

Figure 1:
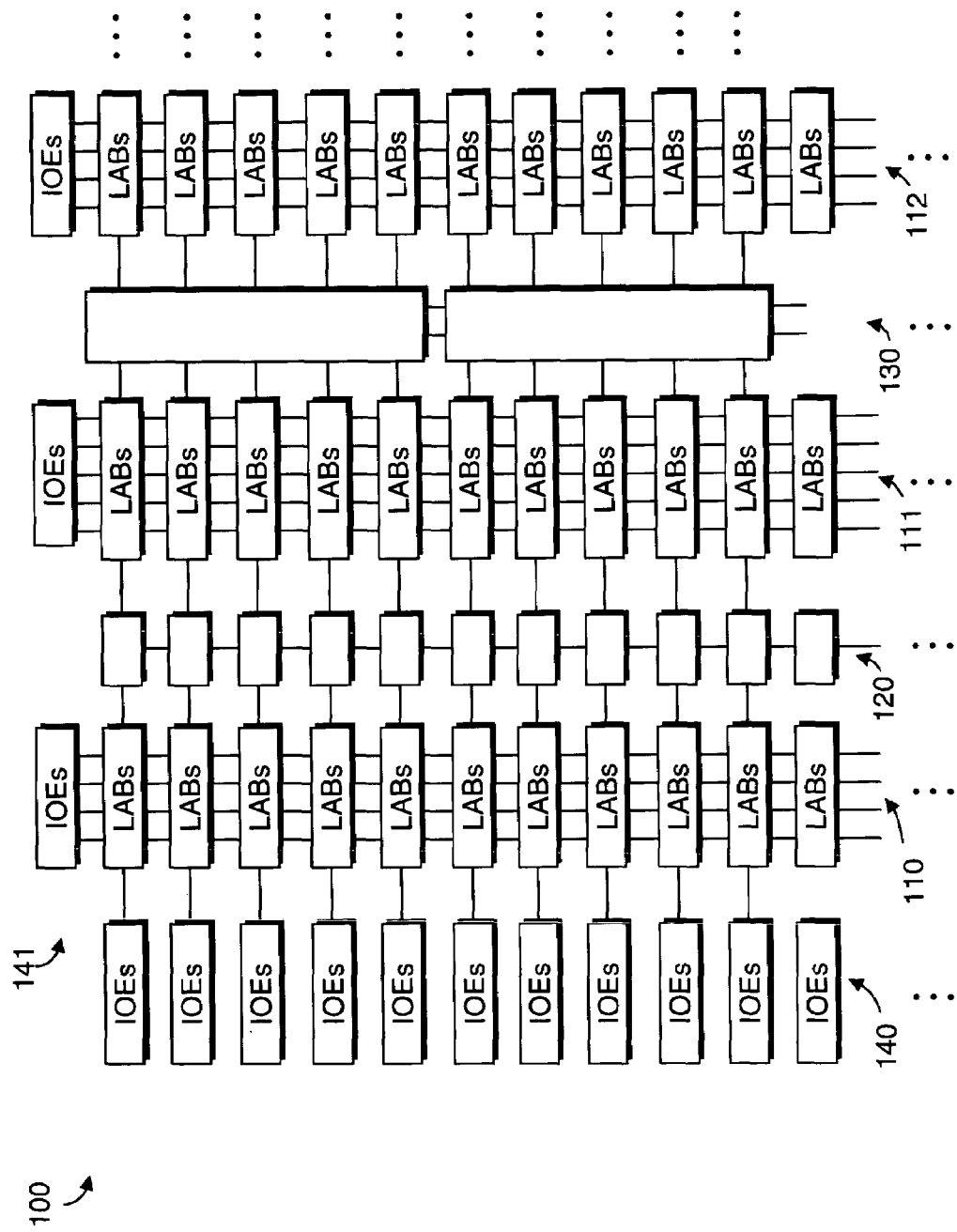
FIG. 1 illustrates a programmable logic device that is configurable to perform data buffering according to an embodiment of the present invention.

FIG. 1 illustrates an exemplary programmable logic device (PLD) 100 according to an embodiment of the present invention. According to one embodiment, the PLD 100 is a chip having a hierarchical structure that may take advantage of wiring locality properties of circuits formed therein. The lowest level of the hierarchy is a logic element (LE) (not shown). An LE is a small unit of logic providing efficient implementation of user logic functions. According to one embodiment of the PLD 100, an LE may include a 4-input lookup table (LUT) with a configurable flip-flop.

The PLD 100 includes a plurality of logic-array blocks (LABs). Each LAB is formed from 10 LEs, LE carry chains, LAB control signals, LUT chain, and register chain connection lines. LUT chain connections transfer the output of one LE's LUT to the adjacent LE for fast sequential LUT connections within the same LAB. Register chain connection lines transfer the output of one LE's register to the adjacent LE's register within a LAB. LABs are grouped into rows and columns across the target device 100. A first column of LABs is shown as 110, a second column of LABs is shown as 111, and a third column of LABs is shown as 112.

The PLD 100 includes memory blocks. The memory blocks may be, for example, dual port random access memory (RAM) blocks that provide dedicated true dual-port, simple dual-port, or single port memory up to various bits wide at up to various frequencies. The memory blocks may be grouped into columns across the target device in between selected LABs or located individually or in pairs within the PLD 100. A column of memory blocks is shown as 120.

The PLD 100 includes digital signal processing (DSP) blocks. The DSP blocks may be used to implement multipliers of various configurations with add or subtract features. The DSP blocks include shift registers, multipliers, adders, and accumulators. The DSP blocks may be grouped into columns across the PLD 100. A column of DSP blocks is shown as 130.

The PLD 100 includes a plurality of input/output elements (IOEs). Each IOE feeds an I/O pin (not shown) on the target device 100. The IOEs are located at the end of LAB rows and columns around the periphery of the PLD 100. Each IOE includes a bidirectional I/O buffer and a plurality of registers for registering input, output, and output-enable signals. When used with dedicated clocks, the registers provide performance and interface support with external memory devices. A first column of IOEs are shown as 140, and a first row of IOEs are shown as 141.

The PLD 100 includes LAB local interconnect lines (not shown) that transfer signals between LEs in the same LAB. The LAB local interconnect lines are driven by column and row interconnects and LE outputs within the same LAB. Neighboring LABs, memory blocks, or DSP blocks may also drive the LAB local interconnect lines through direct link connections.

The PLD 100 also includes a plurality of row interconnect lines ("H-type wires") (not shown) that span fixed distances. Dedicated row interconnect lines route signals to and from LABs, DSP blocks, and memory blocks within the same row. The row interconnect lines span a distance of up to four, eight, and twenty-four LABs and are used for fast row connections in a four-LAB, eight-LAB, and twenty-four-LAB region. The row interconnects may drive and be driven by LABs, DSP blocks, RAM blocks, and horizontal IOEs.

The PLD 100 also includes a plurality of column interconnect lines ("V-type wires") (not shown) that operate similarly to the row interconnect lines. The column interconnect lines vertically routes signals to and from LABs, memory blocks, DSP blocks, and IOEs. Each column of LABs is served by a dedicated column interconnect, which vertically routes signals to and from LABs, memory blocks, DSP blocks, and IOEs. These column interconnect lines include interconnects that traverse a distance of four, eight, and sixteen blocks in a vertical direction.

FIG. 1 illustrates an exemplary embodiment of a PLD. It should be appreciated that the PLD may include components arranged in a manner different than that shown in FIG. 1. A PLD may also include components other than those described in reference to FIG. 1. Thus, while the invention described herein may be utilized on the architecture described in FIG. 1, it should be appreciated that it may also be utilized on different architectures, such as those employed by Altera® Corporation in its APEX™, and Mercury™ family of chips and those employed by Xilinx®, Inc. in its Virtex™ and Virtex™ II line of chips.

Components on the PLD 100 may be used to form a data buffering device. The memory blocks in column 120 may be used to form a memory that store data from a transmitting device on the PLD (not shown). The memory may include, for example, a plurality of first-in-first-out (FIFO) memories. The LEs in column 110-112 may be used to form a memory write manager that directs data transmitted from a data transmitting device to each of the FIFO memories. The LEs in column 110-112 may also be used to form a memory read manager that prepares data stored in the FIFO memories for output prior to receiving a request for the data from a data reading device on the PLD (not shown) in order for the data reading device to receive the data within an acceptable period of time after making the request.

Figure 2:
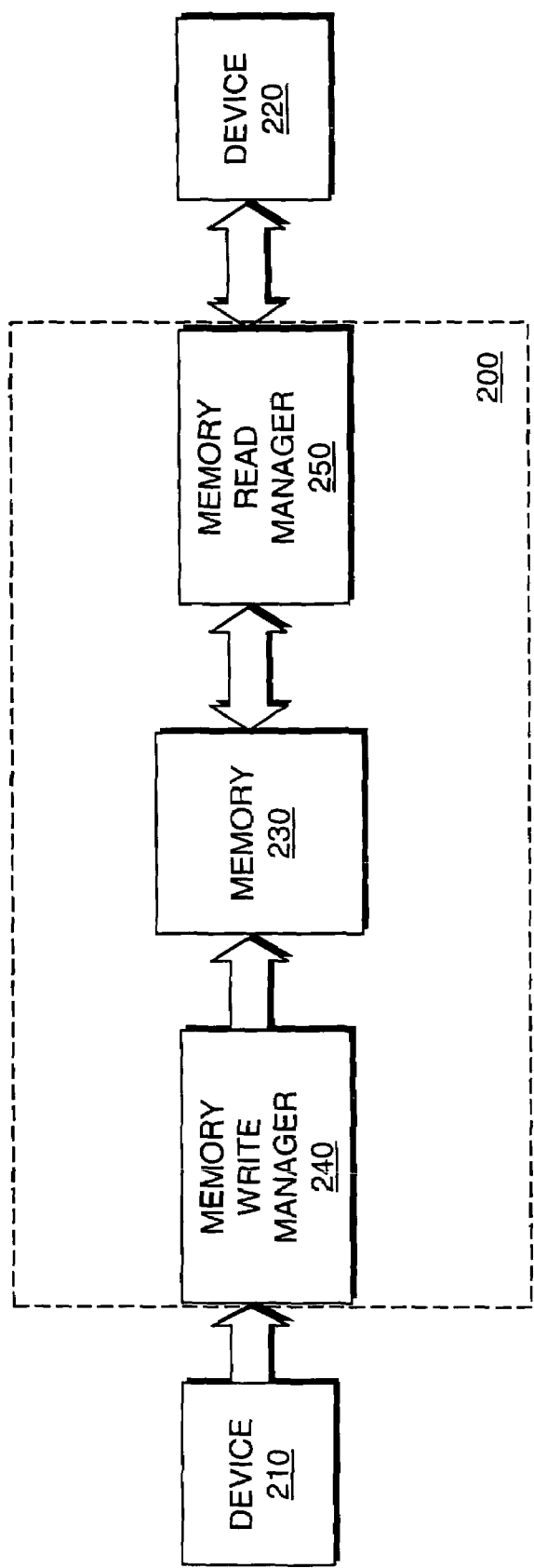
FIG. 2 illustrates a system utilizing a data buffering unit according to an embodiment of the present invention.

FIG. 2 illustrates a system utilizing a buffering device according to an embodiment of the present invention. The system includes a first device 210 and a second device 220 which both may be master devices. The first device 210 is a data transmitting device that transmits data at a first rate. The second device 220 is a data reading device that reads data at a second rate.

Data buffering unit 200 operates as a rate adapter. The data buffering unit 200 allows the first device 210 to write data into the data buffering unit 200 at the first rate and allows the second device 220 to read the data written by the first device 210 at the second rate. The data buffering unit 200 includes a memory 230. According to an embodiment of the present invention, the memory 230 includes a plurality of FIFO memories. Each of the FIFO memories includes a write enable (Wren) input (not shown) that is to be asserted when writing to a FIFO memory and a write address (Wraddress) input (not shown) for receiving an address of a storage location that is to be written to. Each of the FIFO memories also includes a read enable (Rden) input (not shown) that is to be asserted when reading from a FIFO memory and a read address (Rdaddress) input (not shown) for receiving an address of a storage location to be read from. Data read from a data output (not shown) of a FIFO memory may either be registered or unregistered by a flip-flop (not shown).

The data buffering unit 200 includes a memory write manager 240. According to an embodiment of the present invention, the memory write manager 240 directs data transmitted from the first device 210 to be written into each of the FIFO memories in a round robin fashion. The memory write manager 240 translates a write address transmitted by the first device 210, intended for a single memory structure, to an appropriate address for the FIFO memories.

The data buffering unit 200 includes a memory read manager 250. According to an embodiment of the present invention, the memory read manager 250 processes data read requests from the second device 220 and delivers the requested data to the second device 220 within a single clock cycle. The memory read manager prepares data stored in the memory 230 for output prior to receiving a request for the data from the second device 220. This allows data that otherwise would require a clock cycle response time that would be unacceptable to now be pre-fetched and retrieved within an acceptable amount of time.

Figure 3:
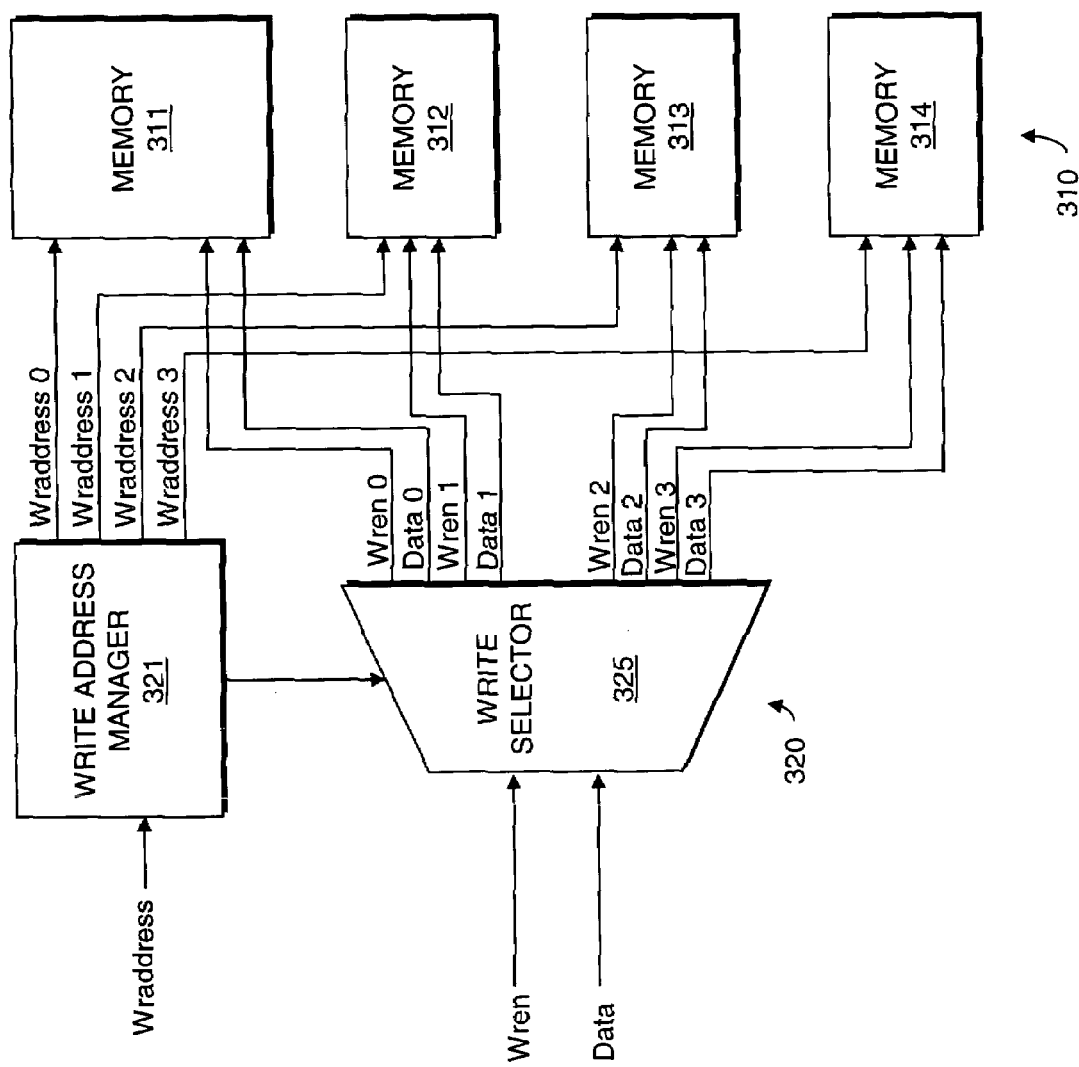
FIG. 3 illustrates a write side of a data buffering unit according to an embodiment of the present invention.

FIG. 3 illustrates a write side of the data buffering unit according to an embodiment of the present invention. The write side shown includes a memory 310 and a memory write manager 320. The memory 310 and the memory write manager 320 may be used to implement the memory 230 and the memory write manager 240 (both shown in FIG. 2). The memory 310 includes a plurality of FIFO memories 311-314. Block 311 represents a first FIFO memory. Block 312 represents a second FIFO memory. Block 313 represents a third FIFO memory. Block 314 represents a fourth FIFO memory. It should be appreciated that the memory 310 may include any number of FIFO memories. According to an embodiment of the present invention, the FIFO memories 311-314 are equal in size and have the cumulative storage capacity of a single memory structure which a transmitting device believes it is addressing. Each of the FIFO memories 311-314 are given a designation 0-3 (00-11 in binary) respectively.

The memory write manager 320 includes a write address manager 321. The write address manager 321 receives a write address (Wraddress) from a data transmitting device. The data transmitting device transmits a write address intended for a single memory structure. The write address manager 321 identifies which of the FIFO memories 311-314 to direct the data to. According to one embodiment of the present invention, the write address manager 321 determines which of the four FIFO memories 311-314 to direct data to from the lower two bits (two least significant bits) of the write address received from the data transmitting device.

The write address manager 321 also determines an address in the FIFO memory to write data transmitted to the memory write manager 320 and transmits this address (Wraddress 0-3) to the appropriate FIFO memory. According to an embodiment of the present invention where the memory 310 includes four FIFO memories, the memory write manager 320 determines the floor of the write address divided by four and uses this as the write address for the FIFO memory.

The memory write manager 320 also includes a write selector 325. The write selector 325 receives a write enable signal and data to be written from the data transmitting device. In response to the FIFO memory identified by the write address manager 321, the write selector 325 transmits the write enable (Wren 0-3) and data (Data 0-3) to the appropriate FIFO memory.

The following is an illustrative example of how the memory write manager 320 operates according to an embodiment of the present invention. In this example, data transmitting device transmits a first data, a write enable, and a write address, 0000, to the memory write manager 320. According to an embodiment of the memory write manager 320, data is written to the FIFO memories 311-314 in a round robin fashion. Write address manager 321 determines from the lower two bits of the write address, 00, that FIFO memory 311 is the FIFO memory to direct the first data, write enable, and a FIFO memory write address. Write address manager 321 determines that the floor of dividing the write address 0000 by 4 is 00 and transmits this write address to FIFO memory 311. Write selector 325 transmits the write enable and first data to FIFO memory 311 in response to the determination made by the write address manager 321.

Data transmitting device transmits a second data, a write enable, and a write address, 0001, to the memory write manager 320. Write address manager 321 determines from the lower two bits of the write address, 01, that FIFO memory 312 is the FIFO memory to direct the second data, write enable, and a FIFO memory write address. Write address manager 321 determines that the floor of dividing the write address 0001 by 4 is 00 and transmits this write address to FIFO memory 312. Write selector 325 transmits the write enable and second data to FIFO memory 312 in response to the determination made by the write address manager 321.

Data transmitting device transmits a third data, a write enable, and a write address, 0010, to the memory write manager 320. Write address manager 321 determines from the lower two bits of the write address, 10, that FIFO memory 313 is the FIFO memory to direct the third data, write enable, and a FIFO memory write address. Write address manager 321 determines that the floor of dividing the write address 0010 by 4 is 00 and transmits this write address to FIFO memory 313. Write selector 325 transmits the write enable and third data to FIFO memory 313 in response to the determination made by the write address manager 321.

Data transmitting device transmits a fourth data, a write enable, and a write address, 0011, to the memory write manager 320. Write address manager 321 determines from the lower two bits of the write address, 11, that FIFO memory 314 is the FIFO memory to direct the fourth data, write enable, and a FIFO memory write address. Write address manager 321 determines that the floor of dividing the write address 0011 by 4 is 00 and transmits this write address to FIFO memory 314. Write selector 325 transmits the write enable and fourth data to FIFO memory 314 in response to the determination made by the write address manager 321.

Data transmitting device transmits a fifth data, a write enable, and a write address, 0100, to the memory write manager 320. Write address manager 321 determines from the lower two bits of the write address, 00, that FIFO memory 311 is the FIFO memory to direct the fifth data, write enable, and a FIFO memory write address. Write address manager 321 determines that the floor of dividing the write address 0100 by 4 is 01 and transmits this write address to FIFO memory 311. Write selector 325 transmits the write enable and fifth data to FIFO memory 311 in response to the determination made by the write address manager 321.

Figure 4:
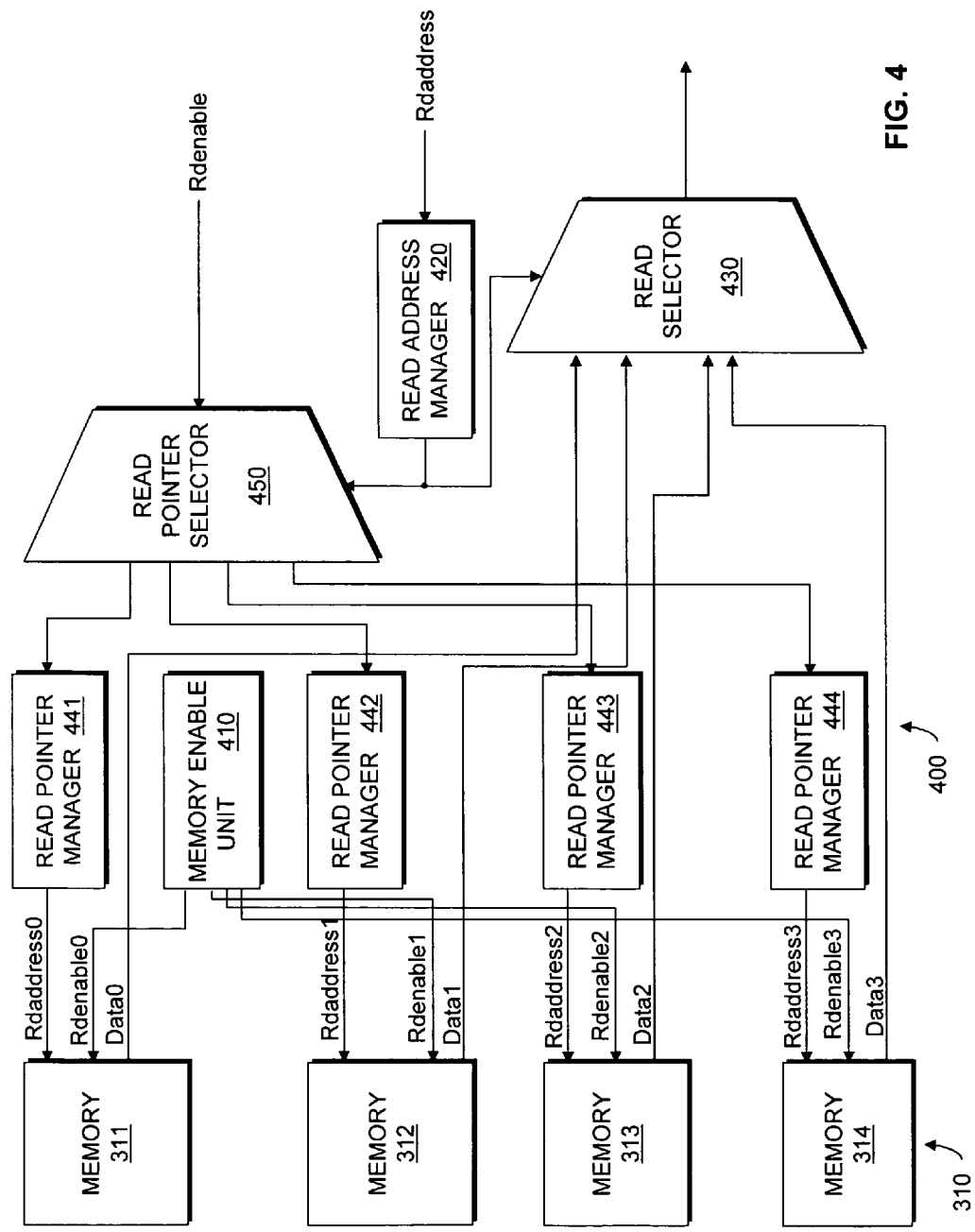
FIG. 4 illustrates a read side of a data buffering unit according to an embodiment of the present invention.

FIG. 4 illustrates a read side of a data buffering unit according to an embodiment of the present invention. The read side shown includes memory 310 and memory read manager 400. The memory 310 and the memory read manager 400 may be used to implement the memory 230 and the memory read manager 250 (both shown in FIG. 2). The memory 310 includes a plurality of FIFO memories 311-314 that operates as the FIFO memories 311-314 described in FIG. 3.

The memory read manager 400 includes a memory enable unit 410. The memory enable unit 410 is coupled to the read enable inputs of FIFO memories 311-314. The memory enable unit 410 operates to transmit a read enable to the FIFO memories 311-314. According to an embodiment of the memory read manager 400, the memory enable unit 410 tie asserts the read enable inputs of FIFO memories 311-314 high such that the FIFO memories 311-314 are always reading data.

The memory read manager 400 includes a read address manager 420. The read address manager 420 receives a read address (Rdaddress) from a data reading device (not shown). The data reading device transmits a read address intended for a single memory structure. The read address manager 420 identifies which of the FIFO memories 311-314 to access to retrieve the requested data. According to one embodiment of the present invention, the read address manager 420 determines which of the four FIFO memories 311-314 to access from the lower two bits (two least significant bits) of the read address received from the data reading device.

The memory read manager 400 includes a read selector 430. The read selector 430 is coupled to the data output of the FIFO memories 311-314. The read selector 430 selects data from the appropriate data output to pass through in response to the FIFO memory identified by the read address manager 420. According to an embodiment of the memory read manager 400 the read selector may pass the selected data to an output register.

The memory read manager 400 includes a plurality of read pointer managers 441-444. The read pointer managers 441-444 are coupled to the read address input of each of the FIFO memories 311-314, respectively. The read pointer managers 441-444 operate to transmit an appropriate address to their respective FIFO memory in order to allow the FIFO memory to "pre-fetch" or prepare data for output prior to receiving an actual request for the data. According to an embodiment of the present invention, the read addresses transmitted to the FIFO memories are initially set to zero. The read pointer managers 441-444 operate to increment the read address transmitted to the FIFO memories 311-314 and to roll the read address back to zero.

The memory read manager 400 includes a read pointer selector 450. The read pointer selector 450 is coupled to each of the read pointer managers 441-444. In response to receiving a read enable from the data reading device, the read pointer selector 450 selects a read pointer manager that corresponds to the FIFO memory identified by read address manager 420. The selected read pointer manager updates the read address transmitted to its respective FIFO memory.

The read side of the data buffering unit shown in FIG. 4 is able to take advantage of the architecture of the FIFO memories 311-314 and the fact that data is written into the FIFO memories ahead of time by a data transmitting device. By setting the read address of the FIFO memories 311-314 to zero at initialization, and by tie asserting the read enable input of the FIFO memories 311-314, data stored at address zero of FIFO memories 311-314 may be prepared to be sent to the data output of the FIFO memories 311-314 before any of the data is actually requested by the data reading device. When a read enable and read address are transmitted by the data reading device to request data from a FIFO memory, the FIFO memory may respond with the pre-fetched requested data within an acceptable period of time. The read pointer manager corresponding to the FIFO directs that FIFO memory to prepare a next data stored for output.

Figure 5:
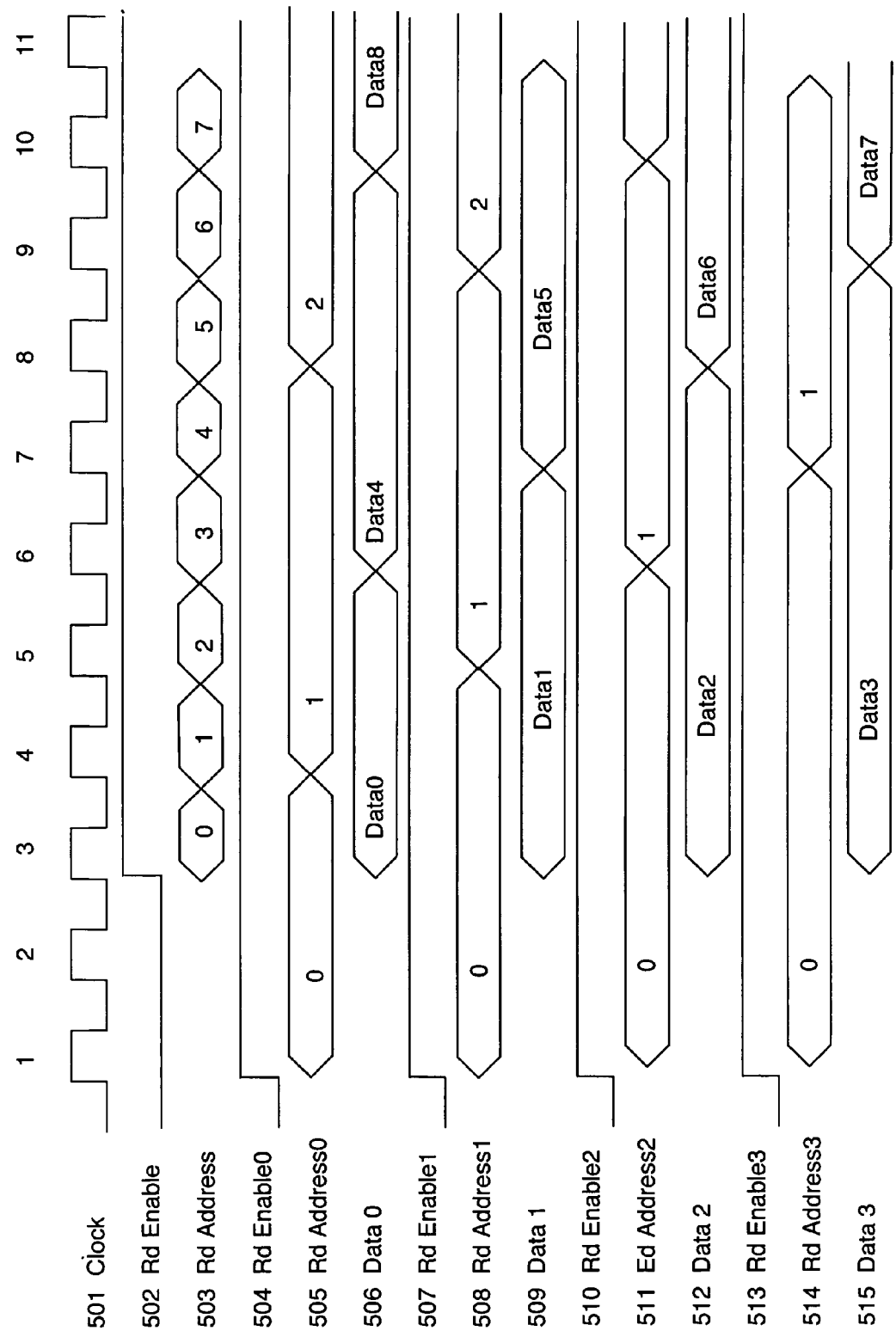
FIG. 5 is an exemplary timing diagram illustrating clock cycle response time of data requests according to an embodiment of the present invention.

FIG. 5 is an exemplary timing diagram illustrating clock cycle response time of data requests according to the embodiment of the present invention shown in FIG. 4. The system clock is shown at 501. The read enable signal generated by the data reading device is shown at 502, and the read addresses generated by the data reading device is shown at 503.

The read enable input to the FIFO memories 311-314 (shown in FIG. 4) are tied asserted high as shown at 504, 507, 510, and 513. The read addresses for FIFO memories 311-314 are initial set to zero as shown at 505, 508, 511, and 514. In this example, it takes the system 2 clock cycles to prepare the requested data for output. Data 0 is ready for output at FIFO memory 311 at time 3 as shown at 506. Similarly, data 1-3 are also ready for output at FIFO memories 312-314 at time 3, as shown at 509, 512, and 515, since they were requested at the same time as data 0.

When the data reading device transmits a read address to request data 0 at time 3 as shown at 503, this triggers the next read address in FIFO memory 311 to be asserted at time 4 as shown at 505. The data associated with that address (data 4) at FIFO memory 311 is ready for output at time 6 as shown at 506.

When the data reading device transmits a read address to request data 1 at time 4 as shown at 503, this triggers the next read address in FIFO memory 312 to be asserted at time 5 as shown at 508. The data associated with that address (data 5) at FIFO memory 312 is ready for output at time 7 as shown at 509.

When the data reading device transmits a read address to request data 2 at time 5 as shown at 503, this triggers the next read address in FIFO memory 313 to be asserted at time 6 as shown at 511. The data associated with that address (data 6) at FIFO memory 313 is ready for output at time 8 as shown at 512.

When the data reading device transmits a read address to request data 3 at time 6 as shown at 503, this triggers the next read address in FIFO memory 314 to be asserted at time 7 as shown at 514. The data associated with that address (data 7) at FIFO memory 314 is ready for output at time 9 as shown at 515.

Figure 6:
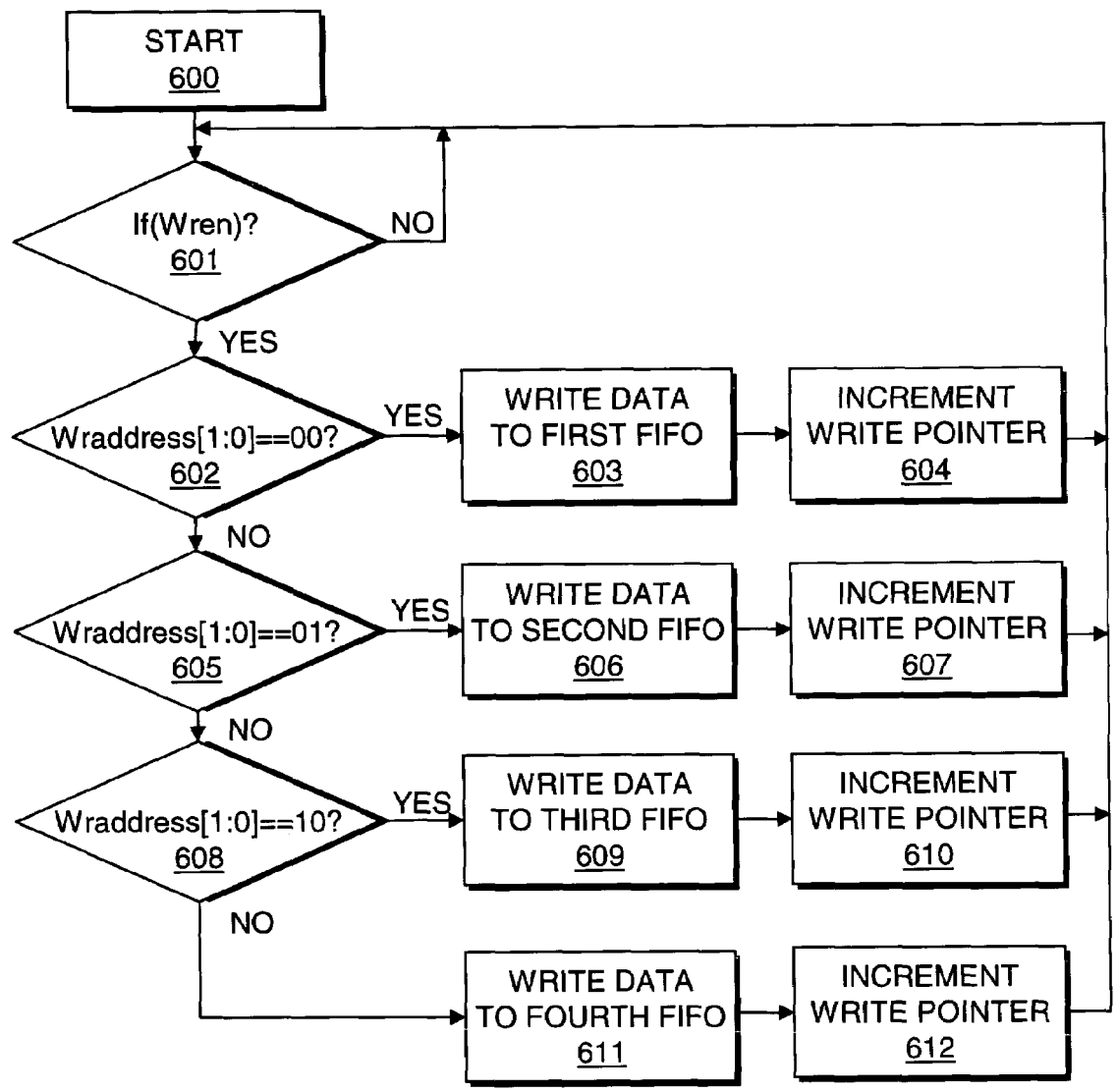
FIG. 6 is flow chart illustrating a method for writing data into a data buffering unit according to an embodiment of the present invention.

FIG. 6 is flow chart illustrating a method for writing data into a data buffering unit according to an embodiment of the present invention. At 601, it is determined whether a write enable has been received. If a write enable has not been received, control returns to 601. If a write enable has been received, control proceeds to 602.

At 602, it is determined whether the lower two bits of the write address is equal to 00. If the lower two bits of the write address is equal to 00, control proceeds to 603. If the lower two bits of the write address does not equal 00, control proceeds to 605.

At 603, the data received is written to the first FIFO memory.

At 604, the write address pointer of the first FIFO memory is incremented.

At 605, it is determined whether the lower two bits of the write address is equal to 01. If the lower two bits of the write address is equal to 01, control proceeds to 606. If the lower two bits of the write address does not equal 01, control proceeds to 608.

At 606, the data received is written to the second FIFO memory.

At 607, the write address pointer of the second FIFO memory is incremented.

At 608, it is determined whether the lower two bits of the write address is equal to 10. If the lower two bits of the write address is equal to 10, control proceeds to 609. If the lower two bits of the write address does not equal 10, control proceeds to 611.

At 609, the data received is written to the third FIFO memory.

At 610, the write address pointer of the third FIFO memory is incremented.

At 611, the data received is written to the fourth FIFO memory.

At 612, the write address pointer of the fourth FIFO memory is incremented. Control proceeds to 601.

Figure 7:
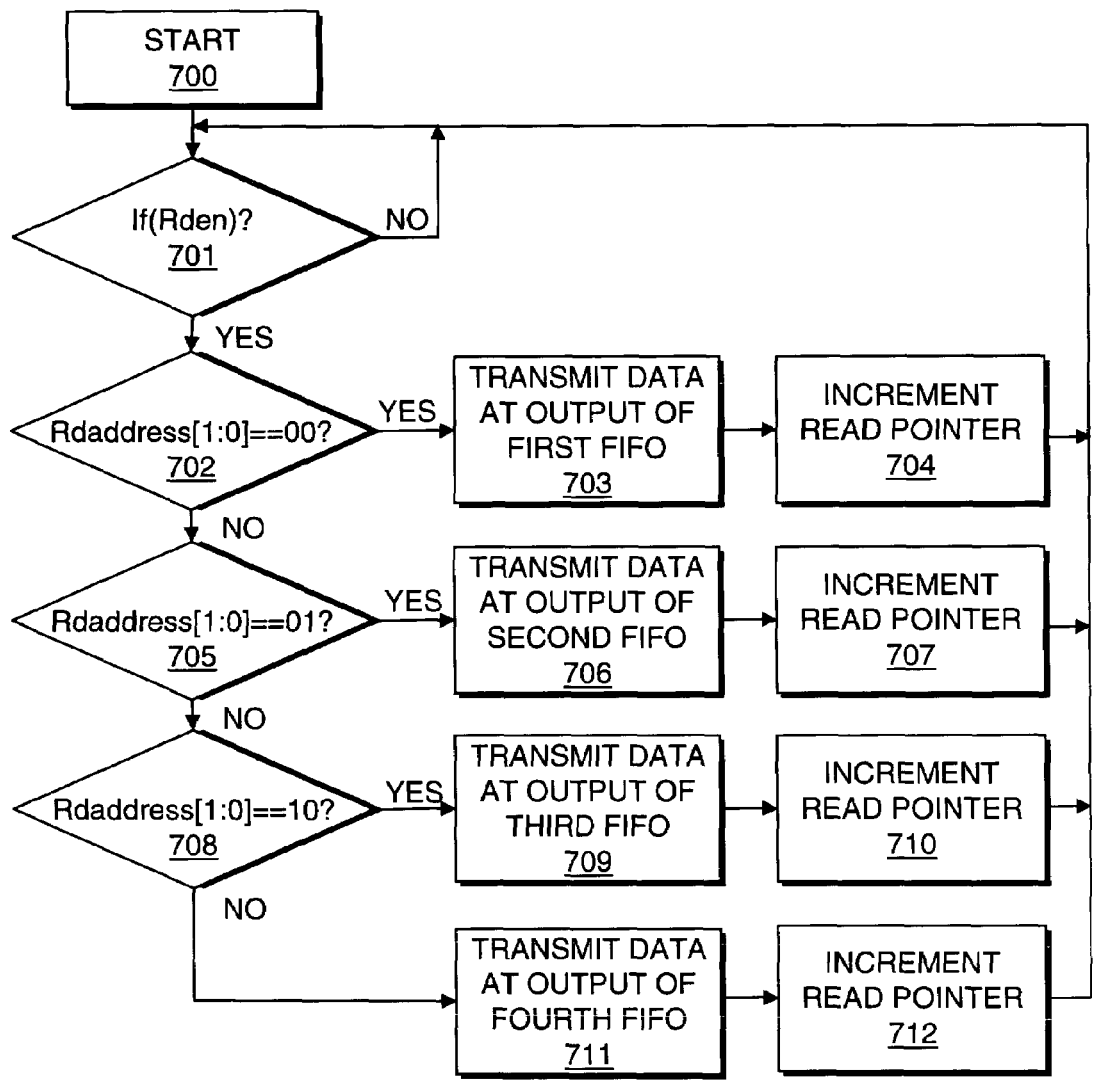
FIG. 7 is a flow chart illustrating a method for reading data from a data buffering unit according to an embodiment of the present invention.

FIG. 7 is a flow chart illustrating a method for reading data from a data buffering unit according to an embodiment of the present invention. At 701, it is determined whether a read enable has been received. If a read enable has not been received, control returns to 701. If a read enable has been received, control proceeds to 702.

At 702, it is determined whether the lower two bits of the read address is equal to 00. If the lower two bits of the read address is equal to 00, control proceeds to 703. If the lower two bits of the read address does not equal 00, control proceeds to 705.

At 703, the data at the output of the first FIFO memory is transmitted.

At 704, the read address pointer of the first FIFO memory is incremented.

At 705, it is determined whether the lower two bits of the read address is equal to 01. If the lower two bits of the read address is equal to 01, control proceeds to 706. If the lower two bits of the read address does not equal 01, control proceeds to 708.

At 706, the data at the output of the second FIFO memory is transmitted.

At 707, the read address pointer of the second FIFO memory is incremented.

At 708, it is determined whether the lower two bits of the read address is equal to 10. If the lower two bits of the read address is equal to 10, control proceeds to 709. If the lower two bits of the read address does not equal 10, control proceeds to 711.

At 709, the data at the output of the third FIFO memory is transmitted.

At 710, the read address pointer of the third FIFO memory is incremented.

At 711, the data at the output of the fourth FIFO memory is transmitted.

At 712, the read address pointer of the fourth FIFO memory is incremented. Control proceeds to 701.

FIGS. 6 and 7 are flow chart illustrating a method for writing data into a data buffering unit and a method for reading data from a data buffering unit according to an embodiment of the present invention. Some of the techniques illustrated in this figure may be performed sequentially, in parallel or in an order other than that which is described. It should be appreciated that not all of the techniques described are required to be performed, that additional techniques may be added, and that some of the illustrated techniques may be substituted with other techniques.

In the foregoing specification the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than restrictive sense.

What is claimed is:

1. A data buffering unit, comprising:
a memory that includes a plurality of first-in-first-out (FIFO) memories to store data;
a memory read manager to tie assert read enable inputs of the FIFO memories and to select a first FIFO memory to output first data stored in a first storage element in the first FIFO memory in response to a first read address from a data reading device, wherein the first data was prepared for output prior to a generation of the first read address.

2. The data buffering unit of claim 1, wherein the memory read manager comprises a memory enable unit that asserts a read enable line to each of the plurality of FIFO memories such that the FIFO memories may always be read.

3. The data buffering unit of claim 1, wherein the memory read manager comprises a read address manager that determines which of the plurality of FIFO memories to access in response to a read address from the data reading device.

4. The data buffering unit of claim 1, wherein the memory read manager comprises a read selector, coupled to data outputs of each of the FIFO memories, to select an appropriate data output to receive data from in response to a read address from the data reading device.

5. The data buffering unit of claim 1, wherein the memory read manager comprises a plurality of read pointer managers, each corresponding to one of the FIFO memories, the read pointer managers transmit an appropriate read address to each of the FIFO memories to prepare data to be prepared for output on the FIFO memories prior to receiving a request for the data from the data reading device.

6. The data buffering unit of claim 1, further comprising a memory write manager that directs data from the data transmitting device to be written into each of the FIFO memories in a round robin fashion.

7. The data buffering unit of claim 6, wherein the memory write manager comprises a write address manager that determines which of the FIFO memories to access in response to a write address received from the data transmitting device.

8. The data buffering unit of claim 7, wherein the write address manager determines a write address in one of the FIFO memories to write data in response to the write address received from the data transmitting device.

9. The data buffering unit of claim 6, wherein the memory write manager comprises a write selector that transmits a write enable signal and data from the data transmitting device to an appropriate FIFO memory in response to the work address manager.

10. A programmable logic device (PLD), comprising,
memory blocks that form comprises a plurality of first-in-first-out (FIFO) memories to store data from a data transmitting device; and
logic elements to form a memory read manager to tie assert read enable inputs of the FIFO memories and to select a first FIFO memory to output first data stored in a first storage element in the first FIFO memory in response to a first read address from a data reading device, wherein the first data was prepared for output prior to a generation of the first read address from the data reading device.

11. The PLD of claim 10, wherein the memory read manager comprises a memory enable unit that asserts a read enable line to each of the plurality of FIFO memories such that the FIFO memories may always be read.

12. The PLD of claim 10, wherein the memory read manager comprises a read address manager to determine which of the plurality of FIFO memories to access in response to a read address from the data reading device.

13. The PLD of claim 10, wherein the memory read manager comprises a read selector, coupled to data outputs of each of the FIFO memories, to select an appropriate data output to receive data from in response to a read address from the data reading device.

14. The PLD of claim 10, wherein the memory read manager comprises a plurality of read pointer managers, each corresponding to one of the FIFO memories, the read pointer managers transmit an appropriate read address to each of the FIFO memories to prepare data to be prepared for output on the FIFO memories prior to receiving a request for the data from the data reading device.

* * * * *